Figure 1A:
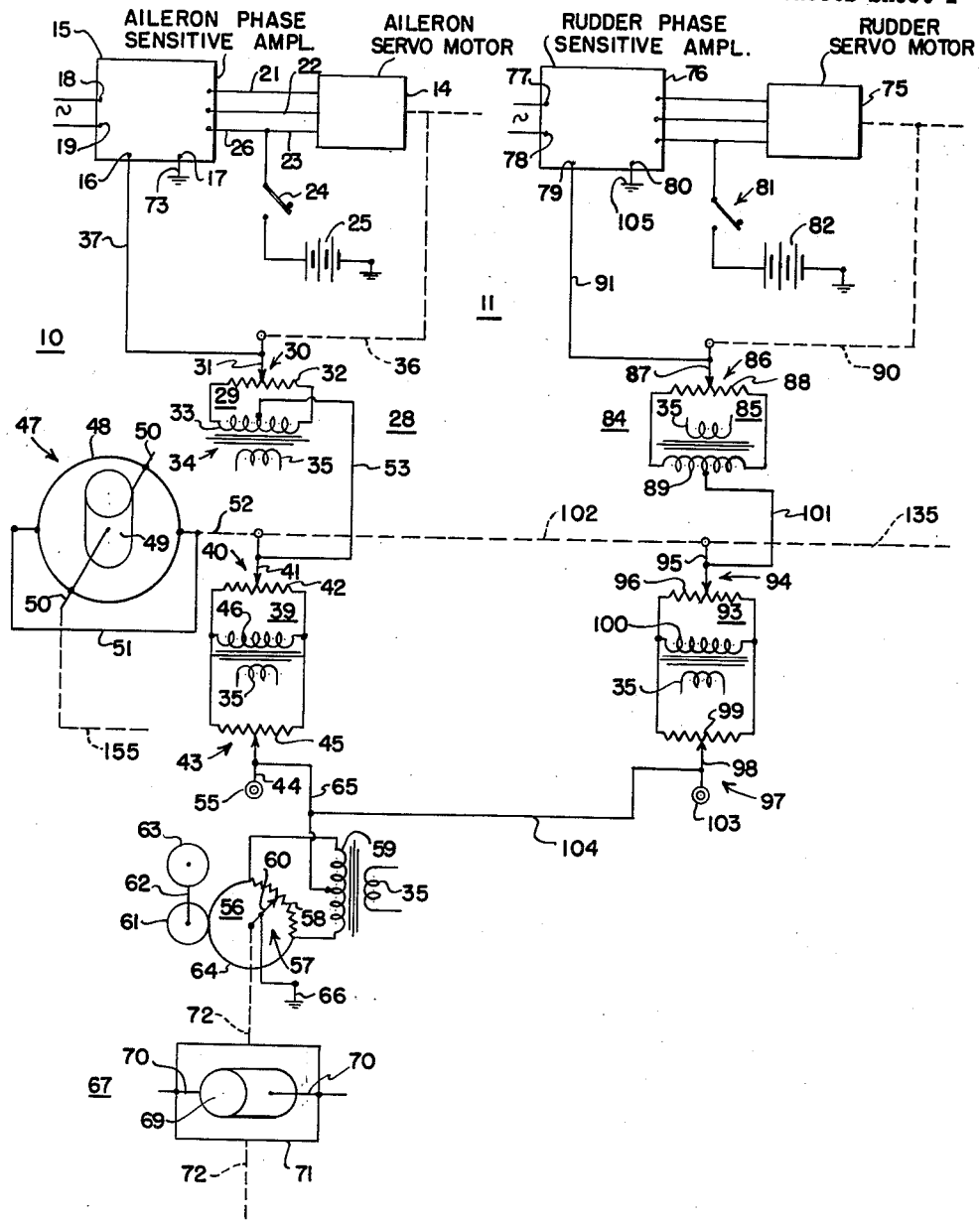

Sept. 17, 1963    R. J. KUTZLER    3,104,083
AUTOMATIC PILOT FOR AIRCRAFT
Filed April 24, 1953    2 Sheets-Sheet 1

INVENTOR.
ROBERT J. KUTZLER
BY
George H. Fisher
ATTORNEY

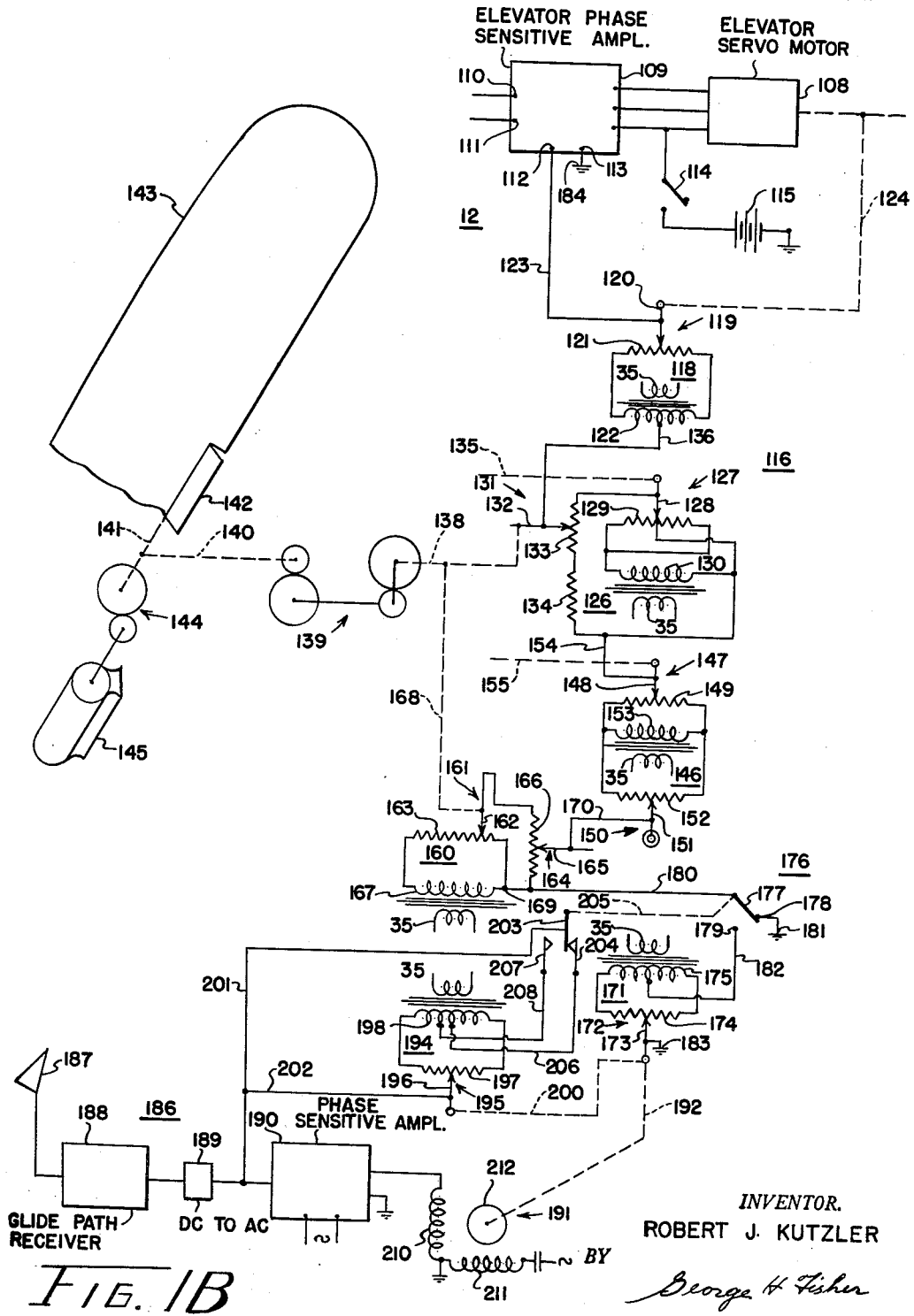

United States Patent Office 3,104,083
Patented Sept. 17, 1963

3,104,083
AUTOMATIC PILOT FOR AIRCRAFT
Robert J. Kutzler, St. Louis Park, Minn., assignor to Minneapolis-Honeywell Regulator Company, Minneapolis, Minn., a corporation of Delaware
Filed Apr. 24, 1953, Ser. No. 350,941
2 Claims. (Cl. 244—77)

The present invention pertains to improvements in automatic pilots for aircraft and particularly for aircraft provided with wing flaps. One type of wing flap may consist of the rear part of the main wing which is hinged so that it can be swung downward except for the small portion of the wing constituting the aileron surface. The flaps in both wings are operated together; and when the flaps are down there is a considerable increase in drag which increase is desirable in landing since the high drag of the wing retards the speed of the airplane. Again, on takeoff, while full downward deflection of the flaps is not utilized a partial downward deflection is used to provide a higher lift coefficient for the wings thereby rendering the craft more stable and capable of climbing at lower air speeds.

The present invention is based on the discovery that when automatic control of the aircraft by radio signals received from a remote radio station located on the ground is applied difficulty is encountered in following the beam formed by these radio signals which form a glide path for the aircraft. This difficulty is encountered when the wing flaps of the aircraft are in a lowered position preliminary to an automatic landing effected by control from the radio signals.

It is an object therefore of this invention to automatically compensate the automatic pilot for the effect of the operated wing flaps so that the aircraft is automatically caused to follow a flight path determined by glide path signals from a radio receiver.

A still further object of the present invention is to provide a compensating control effect in the automatic pilot for the aircraft which effects a downward position of the elevator control surface which opposes the effect on the craft of operated wing flaps so that the aircraft may be automtically caused to follow a flight path defined by radio signals.

The present invention also involves the executing by the aircraft of banked turns without loss of altitude by said craft. In some aircraft, the wing flaps are partially operated at low airspeeds in order that the wings of the aircraft provide a lift sufficiently high to sustain flight of the craft. While it is known to provide automatically an up elevator signal in response to banked turns of the craft to prevent loss of altitude while so banked, the present invention provides for an increased control effect from the operated up elevator resulting when the craft is banked when the wing flaps have been moved to a partially operated position at the low airspeeds mentioned.

The present invention therefore also relates to improvements in aircraft automatic pilots for executing banked turns without loss of altitude.

A further object of the present invention is to provide a novel elevator control channel for an automatic pilot for an aircraft which is responsive to the angle of bank of the aircraft and to the position of the wing flaps of the aircraft.

A still further object of the present invention is to provide a novel elevator control channel for an automatic pilot whereby in response to banking of the craft an up elevator effect is provided with said effect being modified in accordance with the position of the wing flaps of the aircraft.

The above and further objects of the invention and the principles embodied therein will become more evident upon a consideration of the following detailed description thereof taken in conjunction with the accompanying drawings, in which:

FIGURES 1A and 1B together constitute a schematic arrangement of a three channel automatic pilot for an aircraft, with the improved elevator channel.

Referring to the drawing, FIGURE 1A discloses the aileron channel 10 and the rudder channel 11 of a three channel automatic pilot for an aircraft and FIGURE 1B discloses the elevator channel 12 therefor. In the aileron channel 10, an aileron servomotor 14 reversibly positions aileron surfaces (not shown) of the aircraft. The motor 14 is controlled from an alternating voltage phase sensitive amplifier 15. The amplifier includes signal input terminals 16, 17, and power input terminals 18 and 19 and a pair of operable relays. When the phase relationships of the alternating input control signal voltage and the alternating input power voltage is the same, one relay in the amplifier 15 is operated to transmit D.C. power through conductor 21 to effect rotation of the motor 14 in one direction. When the signal voltage and the power voltage are of opposite phase the other amplifier relay is energized to supply D.C. voltage by means of conductor 22 to effect rotation of the servomotor 14 in the opposite direction. D.C. supply voltage into the amplifier 15 is supplied from a battery 25 through a manually operable single pole single throw switch 24 and conductor 26. D.C. voltage is also supplied into the servomotor 14 through conductor 23 from battery 25 to energize the brake windings thereof. The amplifier-servomotor combination may be similar to that disclosed in Patent No. 2,425,734 to Willis H. Gille et al.

The amplifier signal input terminals 16, 17 are connected to a balanceable alternating voltage network 28 comprising a servo follow-up voltage generator 29, a bank angle-manual trim generator 39 and an automatic heading responsive generator 56. The generator 29 comprises a potentiometer 30 having a slider 31 and a resistor 32 which is connected across a secondary winding 33 of a transformer 34 having a primary winding 35 connected to the source of alternating voltage. The slider 31 is positioned along resistor 32, from the electrical center thereof, by a suitable operating connection 36 extending therefrom to the aileron servomotor 14. A conductor 37 connects amplifier terminal 16 with slider 31. Voltage generator 39 comprises a craft bank angle potentiometer 40, a secondary winding 46 of transformer 34, and a manual trim potentiometer 43. Potentiometer 40 comprises a slider 41 and a resistor 42 which is connected across the secondary winding 46. Potentiometer 43 comprises a slider 44 and a resistor 45 which is connected across secondary winding 46 in parallel with potentiometer winding 42. Slider 41 is positioned along resistor 42 in either direction from the electrical center thereof by a vertical gyroscope 47 in accordance with the bank angle of the craft. The gyroscope 47 for sensing craft attitude about the pitch and roll axes conventionally comprises a rotor (not shown) carried in a casing 49 for rotation about a vertical spin axis. The casing 49 has trunnions 50 rotatably supported in a gimbal ring 48 on an axis parallel to the pitch axis of the aircraft. The gimbal ring 48 is in turn carried about a second horizontal axis at right angles to the axis of trunnions 50 in a suitable support 51. Rotations of the craft about the bank axis and reflected by the tilt of the gimbal ring 48 are transmitted from the gyroscope 47 to slider 41 by the operating connection 52. A conductor 53 connects a center tap of secondary winding 33 to slider 41. Slider 44 is manually positioned along resistor 45 by a manually operable knob 55. Generator 56 comprises a potentiometer 57 having a slider 60 and resistor 58 which is connected across a secondary winding 59 of the transformer. Resistor 58 is carried on a circular member 64 rotatable with respect to the aircraft. Member 64 peripherally engages a second circular member 61 carried on a shaft 62 which is rotated by a manually operable knob 63. Thus by rotation of the knob 63 the resistor may be rotated with respect to the slider 60. The slider 60 is stabilized by a directional gyroscope 67. The gyroscope includes a rotor (not shown) carried on a horizontal spin axis within casing 69 which in turn has its trunnions 70 supported in an outer gimbal ring 71 for rotation about a horizontal axis perpendicular to the spin axis. The outer gimbal ring 71 is supported on vertically arranged trunnions 72, the upper one of which connects to slider 60. A conductor 65 connects manually operable slider 44 to a center tap of winding 59 and a conductor 66 connects slider 60 to ground. The amplifier input circuit is completed from ground through the amplifier ground conductor 73 to the remaining amplifier signal input terminal 17.

In the rudder channel 11, the rudder (not shown) is operated by a rudder servomotor 75 which is reversibly operated from a phase sensitive amplifier 76. The amplifier-servomotor combination in the rudder channel is similar to that used in the aileron channel with the amplifier including the alternatively operable relays. The rudder servomotor amplifier 76 includes power input connections 77, 78 supplied from the source of alternating voltage and signal input terminals 79, and 80. In accordance with the instantaneous phase relationship of the alternating signal voltage across input terminals 79, and 80 with respect to the alternating power voltage across terminals 77, 78 one or the other relay is energized. Upon such energization, D.C. voltage is supplied from battery 82 through the single pole single throw switch 81 into amplifier 76 and through contacts of the operated amplifier relay to control the direction of rotation of the rudder servomotor 75. The brake windings of motor 75 conventionally are also energized from battery 82 through the switch 81.

The signal input terminals 79, and 80 of amplifier 76 are connected to a balanceable voltage network 84 comprising a follow-up voltage generator 85, a bank attitude-trim voltage generator 93, and voltage generator 56 of balanceable network 28. The voltage generator 85 comprises a potentiometer 86 having a slider 87 and resistor 88 which is connected across a secondary winding 89 of the transformer. The slider 87 is positioned in accordance with the displacement of the rudder servomotor 75 by a suitable operating connection 90 connecting servomotor 75 and slider 87. A conductor 91 connects amplifier terminal 79 with slider 87. Voltage generator 93 comprises a potentiometer 94 having a slider 95 and resistor 96, a trim potentiometer 97 having a slider 98 and resistor 99, and a secondary winding 100 of the transformer. Resistors 96 and 99 are connected in parallel across the secondary winding 100. Slider 95 is positioned along resistor 96 in either direction from the center thereof by a suitable operating connection 102 connected to slider operating means 52. Slider 98 may be manually positioned along resistor 99 through a manually operable knob 103.

A conductor 101 connects a center tap of secondary winding 89 to slider 95. A conductor 104 connects slider 98 with the center tap of secondary winding 59 in voltage generator 56. The input circuit of amplifier 76 is completed through ground conductor 66 to ground conductor 105 connected to amplifier terminal 80.

In the elevator channel 12, the elevator surface (not shown) is positioned by an elevator servomotor 108 which is reversibly controlled from an elevator servomotor phase sensitive amplifier 109. The elevator amplifier-servomotor combination may be similar to that used in the aileron channel. The elevator amplifier 109 includes alternating voltage power input terminals 110, 111 connected to the source of alternating voltage and alternating signal voltage input terminals 112, 113 connected to a source of alternating control signals. Depending upon the instantaneous phase relationship of the alternating signal voltage to the alternating power voltage, D.C. voltage is supplied from battery 115, through the single pole single throw switch 114 into amplifier 109, and through contacts of an operated amplifier relay to the clutch windings of servomotor 108. The brake windings of the servomotor 108 are directly energized from battery 115 through the single pole-single throw switch 114.

Control signals are applied across amplifier terminals 112, 113 from a balanceable voltage network 116. Network 116 comprises a follow-up voltage generator 118, an up elevator voltage generator 126, a pitch attitude-elevator trim generator 146, a wing flap position signal generator 160, a function selector 176, and a guide path signal generator 171. Signal generator 118 comprises a follow-up potentiometer 119 having a slider 120 and a resistor 121 which is connected across a secondary winding 122 of the transformer. A conductor 123 connects slider 120 with amplifier terminal 112. Slider 120 is operated along resistor 121 through a suitable operating connection 124 extending therefrom to the output end of the elevator servomotor 108. Signal generator 126 comprises an up elevator potentiometer 127 comprising a slider 128 and resistor 129, a secondary winding 130 of the transformer, a voltage dividing potentiometer 131 having a slider 132 and resistor 133, and a protective resistor 134. The opposite ends of resistor 129 are connected to a common end of secondary winding 130 and a center tap of resistor 129 is connected to the remaining end of secondary winding 130. Resistors 133 and 134 are connected in series with the remaining end of resistor 133 being connected to slider 128 and the opposite end of resistor 134 being connected to the center tap of resistor 129. A conductor 136 connects a center tap of secondary winding 122 in signal generator 118 to slider 132. Slider 128 is displaced along resistor 129 from the center tap thereof in either direction in accordance with the bank angle of the aircraft by a suitable operating connection 135 connecting slider 128 with the operating means for slider 95 in the rudder channel. Irrespective of the direction of bank of the craft, the phase of the signal supplied by potentiometer 127 is the same so that an up elevator control signal is applied. Slider 132 is positioned along resistor 133 to supply a desired ratio of the up elevator signal from potentiometer 127 into the network 116.

Slider 132 is positioned along resistor 133 from an output member 138 of a gear train 139. The gear train 139 includes an input member 140 driven from a shaft 141 that operates a wing flap 142 of an aircraft wing surface 143. The shaft 141 is driven through a gear train 144 from a flap operating motor 145. The motor 145 as conventional may be selectively controlled by means not pertinent herein and therefore not shown. Signal voltage generator 146 comprises a pitch attitude potentiometer 147 having a slider 148 and resistor 149, an elevator trim potentiometer 150 having a slider 151 and resistor 152, and a secondary winding 153 of the transformer. Resistors 149 and 152 are connected in parallel across the secondary winding 153. A conductor 154 connects the center tap of resistor 129 in signal voltage generator 126 to slider 148. Slider 148 is positioned along resistor 149 by a suitable operating connection 155 extending from trunion 50 of the vertical gyroscope 47 whereby the slider movement is proportional to the longitudinal attitude of the aircraft with respect to its pitch axis. Signal voltage generator 160 comprises a flap position potentiometer 161 having a slider 162 and resistor 163, a voltage dividing or gain control potentiometer 164 comprising an adjustable tap 165 and resistor 166, and a secondary winding 167 of the transformer. Resistor 163 is connected across the secondary winding 167. Resistor 166 has one end connected to slider 162 and its opposing end to one end of secondary winding 167 adjacent slider 162. A conductor 170 connects slider 151 with adjustable tap 165 which is adjusted to select various portions of the voltage across resistor 166. Slider 162, with the flap in raised position, is at the end of resistor 163 when no voltage is supplied across the voltage dividing resistor 166. As the flap is moved toward lowered position, the slider 162 is moved along resistor 163 to supply a voltage across voltage dividing resistor 166. The slider 162 is operated in accordance with the movement of the wing flap by a suitable operator 168 connecting slider 162 and the gear train output member 138.

The function selector 176 comprises an operable two position switch arm 177 which may alternatively engage contacts 178 or 179. A conductor 180 connects the operable arm 177 to secondary winding end 169. A ground conductor 181 extends from contact 178. A conductor 182 connects contact 179 with a center tap of secondary winding 175 in signal voltage generator 171. Voltage generator 171 additionally includes a glide path signal potentiometer 172 having an operable slider 173 and resistor 174 which is connected across the ends of secondary winding 175. A conductor 183 extends from slider 173 to ground and the amplifier input circuit is completed through amplifier ground conductor 183 to terminal 113.

The slider 173 is positioned along resistor 174 by a radio beam glide path responsive arrangement 186. The arrangement 186 comprises conventionally a radio antenna 187 responsive to radio signals emitted by a ground station. The signals detected by the antenna 187 are supplied to a glide path receiver 188 which provides a unidirectional output voltage proportional to the angular displacement of the aircraft from a glide path beam. The output of the receiver is supplied to a converter 189, which may be of the vibrator type having an operating winding connected to the alternating voltage supply source of the craft. The converter 189 supplies an alternating output control voltage to a phase sensitive amplifier 190 which in turn controls a capacitor type induction motor 191 whose output shaft 192 is connected to slider 173.

In order to cause slider 173 to be displaced in accordance with the vertical displacement of the craft from the glide path, a follow-up network 194 is supplied to rebalance the input circuit of amplifier 190. The voltage generator 194 comprises a follow-up potentiometer 195 having a slider 196 and resistor 197 which is connected across the ends of a secondary winding 198 of the transformer. The slider 196 is positioned along resistor 197 by a suitable operating connection 200 connecting slider 196 to the operating means of slider 173. Rebalancing signals are applied to amplifier 190 by conductors 201 and 202. Conductor 202 extends between amplifier 190 and slider 196 and conductor 201 extends between amplifier 190 and an operable switch arm 203. Arm 203 is operatively connected with movable switch arm 177, and it engages opposed contacts 204, 207. A conductor 206 connects contact 204 with a center tap of secondary winding 198 and a conductor 208 connects contact 207 with a second tap of secondary winding 198 for a purpose to be later described. In the present position of the operable arm 203 signals applied to amplifier 190 from the converter 189 cause the amplifier 190 to energize a motor winding 210 in proportion to the magnitude of input signal of the amplifier. The other winding 211 of motor 191 is continuously energized from the alternating source through a phasing condenser. The rotor 212 of the motor rotates in one or the other direction depending upon the instantaneous phase relationship between the amplifier input voltage with respect to the voltage from the ship supply which is also applied to the amplifier. The rotation of rotor 212 is applied to sliders 173 and 196 so that a rebalancing signal is provided by signal voltage generator 194 to proportion the movement of sliders 173 and 196 from the centers of their respective resistors in accordance with the magnitude of the input signal from converter 189.

When the operable arm 203 engages contact 207 without there being any present input signal from converter 189, the amplifier 190 effects rotation of motor 191 so that sliders 173 and 196 are again displaced until the amplifier input signal is reduced to zero. The amount of adjustment of slider 173 from its normal center position is sufficient to give a 2½ degree change in the longitudinal attitude of the aircraft and approximates the value of the angle of the glide path beam with respect to the ground.

The apparatus operates in the following manner. If it be desired to effect an automatic landing with the automatic pilot controlled by glide path signals during the portion of the flight when the aircraft is not appreciably changing heading, the function selector 177 is moved clockwise from its position shown so that arm 177 engages contact 179 and arm 203 engages contact 207. If the craft had been in normal level flight attitude, the engagement of arm 203 with contact 207 would cause unbalance of the input circuit to amplifier 190. The amplifier 190 would effect rotation of the motor 191 which is transmitted to sliders 173 and 196. Slider 196 is adjusted by the motor until the input circuit to amplifier 190 has been balanced. The movement of slider 173 causes an unbalance of the elevator amplifier voltage control network 116 and a control signal is applied across terminals 112, 113 of the elevator amplifier 109. This control signal effects operation of the amplifier 109 and the consequent operation of the elevator servomotor 108. Motor 108 positions the elevator surface and simultaneously rebalances the network 116 by displacing slider 120. As the craft changes its longitudinal attitude, the attitude change is sensed by the vertical gyroscope 47 which through its operating connection 155 displaces slider 148. The operation of slider 148 causes the signal voltage generator 146 to supply a control signal in network 116 which opposes the signal from voltage generator 171. The resultant effects of the voltages from generators 146 and 171 is such that the craft assumes approximately a 2½ degree down attitude with respect to level flight position.

Radio signals detected on antenna 187 and receiver 188 may then be applied to amplifier 190 which again operates the control motor 191 to supply additional signals in network 116 whereby the aircraft is automatically controlled to follow the radio beam.

As a preliminary to an actual landing of the craft, the wing flaps of the wing surfaces are moved to lowered position to reduce the velocity of the aircraft during the descent. The operation of flap 142 causes simultaneous displacement of slider 162 from an end of resistor 163 adjacent terminal 169 toward the opposite end of the resistor. A portion of this voltage is selected by the adjustment of slider 165 and this voltage from generator 160 is applied to network 116 which effects a downward displacement of the elevator surfdace.

Without the downward displacement of the elevator surface at this time, the lowering of the flap 142 increases the lift coefficient of the wing 143 which results in an increase in altitude of the aircraft. The increase in altitude brings the craft away from the beam. It applies a continual effect on the craft's altitude which cannot be corrected by the limited signal from network 171 responsive to radio signals proportional to the craft angular deviation from the glide path beam. However, with the elevator displaced additionally with depression of the wing flap 142, the displaced surface effects a change in the craft pitch attitude and thus offsets the effect of the displaced wing flap. The signals from the voltage generator 171 are thus continuously effective to guide the craft along the glide path beam to touchdown.

In another situation when it is merely desired to control the craft in level flight and from a heading responsive device, the arm 177 is positioned to engage contact 178 so that any previous down elevator occasioned by the shift in control point away from the center tap of the secondary winding 198 is removed. The longitudinal and lateral attitudes of the aircraft are automatically controlled from the vertical gyroscope 47 and heading of the aircraft is controlled from the directional gyroscope 67. In straight and level flight when the craft is following the heading determined by gyroscope 67, the various sliders in networks 23, 84 and 116 are normally at the centers of their respective resistors, with slider 162 adjacent terminal 169.

If it be desired to change heading, the knob 63 may be rotated to angularly displace member 64 supporting resistor 58 with respect to slider 60 whereby an unbalance of aileron and rudder amplifier networks 28 and 84 occurs. The aileron and rudder surfaces are therefore displaced and the follow-up potentiometers 31 and 87 are operated to rebalance the networks. The aircraft banks under the applied aileron and rudder and undergoes a banked turn. In response to the bank of the craft, the vertical gyroscope 47 displaces sliders 41 and 95 to cause the aileron and rudder surfaces to be moved back toward their normal positions. Thus the magnitude of the bank of the craft is limited to the amount of control signal derived by rotation of knob 63.

In the elevator channel, the vertical gyroscope 47 effects displacement of slider 128 so that an up elevator signal is supplied to elevator amplifier network 116. Thus the elevator surface is moved in a slightly upward direction with the servomotor operated follow-up connection 124 adjusting slider 120 to balance the network.

If the aircraft be flying at a low airspeed, the flaps 142 will have been placed in a partially lowered position to increase the lift of the aircraft wing surfaces to maintain flight. The lowering of the flap 142 will simultaneously adjust slider 162 to provide a down elevator signal in network 116.

When the aircraft is in a banked turn and the flaps are in lowered position, the ratio of the up elevator signal provided by signal generator 126 must be altered so that a greater value of the signal supplied by operation of slider 128 should be supplied to network 116 to prevent loss of craft altitude in the turn. Thus along with the operation of slider 162 to provide down elevator the adjustable slider 132 is moved by flap responsive means 140, 139, 138 toward the end of resistor 133 adjacent to slider 128 to increase the amount of voltage supplied to network 116 from signal generator 126 as the wing flap is moved to lowered position. The amount of movement given to slider 132 is such that the magnitude of the up elevator voltage supplied to network 116 maintains the craft in a banked turn without loss of altitude.

It will now be apparent that I have provided an improved elevator control system wherein one type of operation thereof facilitates automatically navigating an aircraft along a radio beam by operating the elevator surface to cause descent of an aircraft and wherein another form of operation thereof functions to prevent loss of altitude of the aircraft in banked turns by operation of the elevator surface with both forms of control being compensated by a change in the physical configuration of the aircraft caused by lowering of the wing flaps of the craft.

What is claimed is:

1. In a navigational control system for an aircraft having aileron, rudder, elevator and wing flap surfaces, in combination: aileron and rudder servomotors; a control circuit means for controlling the aileron servomotor, a control circuit means for controlling the rudder servomotor, a heading responsive device; a pickoff operated by said heading responsive device and connected to both aileron and rudder servomotor control circuit means; manual means for adjusting said pickoff to place the craft in a banked turn; an elevator servomotor, control circuit means for said elevator servomotor; a craft bank attitude pickoff in said elevator circuit means; means for positioning the flaps of said aircraft, means operated by said flap positioning means while said flaps are in operated position to modify the output of the bank attitude pickoff; and follow-up connections from the aileron, rudder, and elevator servomotors to their respective control means circuits.

2. In an automatic pilot for an aircraft having aileron, rudder, wing flap, and elevator control surfaces, in combination: servomotors for operating the aileron, rudder, and elevator control surfaces; a balanceable circuit means for each aileron and rudder servomotor; manually operable means for unbalancing the aileron and rudder balanceable circuit means for placing said craft in a banked turn; follow-up means driven by said aileron and rudder servomotors for rebalancing said control circuits; means responsive to bank of said craft for unbalancing the aileron and rudder servo means control circuits to modify the positions of said surfaces; a control circuit for said elevator servomotor, means in said circuit responsive to bank of craft for unbalancing said circuit tending to cause movement of the elevator in an upward direction; follow-up means positioned by said elevator servomotor to rebalance said control circuit; and further means responsive to the operation of the wing flap of said aircraft toward lowered position for increasing the amount of up elevator position to compensate for the decrease in airspeed of the craft due to the operation of the flap.

References Cited in the file of this patent
UNITED STATES PATENTS

| | | |
|---|---|---|
| 2,452,311 | Markusen | Oct. 26, 1948 |
| 2,515,349 | Kutzler | July 18, 1950 |
| 2,627,384 | Esval | Feb. 3, 1953 |